3,663,657
EMULSION-SUSPENSION GRAFT
COPOLYMERIZATION PROCESS
Alan Charles Sturt, Guilford, England, assignor to
BP Chemicals Limited, London, England
No Drawing. Filed May 14, 1970, Ser. No. 37,356
Claims priority, application Great Britain, May 19, 1969,
25,418/69
Int. Cl. C08f 1/11, 29/24
U.S. Cl. 260—878 R 5 Claims

ABSTRACT OF THE DISCLOSURE

Process comprising mixing a saturated polymer in latex form with vinyl chloride, destroying the latex emulsifying agent so that the polymer particles pass into the vinyl chloride and polymerising the latter, preferably under suspension polymerisation conditions.

---

The present invention relates to vinyl chloride polymer compositions and particularly to a process for the production of such compositions by polymerising vinyl chloride containing preformed polymeric material.

It is known that useful vinyl chloride polymer compositions are obtained by distributing various polymeric materials as finely divided particles throughout a vinyl chloride polymer which may be in the form of a continuous phase or may be particulate.

Such compositions have been prepared by various techniques. For example the two polymeric materials can be physically blended. Such a process is expensive and it is difficult to ensure adequate mixing and to control the particle sizes of the components of the mixture to obtain optimum properties.

An object of the present invention is to provide an improved technique for the production of vinyl chloride polymer compositions.

According to the present invention the process for the preparation of a polymer composition comprises mixing a polymeric material which has a glass transition temperature above 20° C. and which is not soluble in vinyl chloride in the form of an aqueous latex stabilised by means of a destructible emulsifying agent with monomeric material consisting essentially of vinyl chloride, destroying the emulsifying agent without substantially altering the size of the polymeric material particles, allowing particles to pass into the monomeric material and polymerising the monomeric material with said particles dispersed therein.

Polymeric material having a glass transition temperature below 20 should not be used in the process of the present invention because the particles thereof have a greater tendency to coagulate irreversibly when the emulsifying agent is destroyed so changing the size of the particles of the polymeric material ultimately present in the final composition.

The polymeric material must be in the form of a stable aqueous latex, i.e. it is distributed throughout a continuous aqueous phase as finely divided particles which are stabilised and therefore do not coalesce or settle out because of the presence in the aqueous phase of the emulsifying agent. Aqueous latices of polymeric materials are well known and are usually prepared by the well known emulsion polymerisation technique. Any polymeric material that has a sufficiently high glass transition temperature (TG) and that can be prepared as or converted into a stable aqueous latex can be used in a process according to the present invention. Examples of such polymeric materials are certain addition polymers and copolymers from monomeric materials such as ethylene, propylene, styrene, acrylonitrile, lower ($C_1$ to $C_6$) alkyl methacrylates, e.g. methyl methacrylate and vinyl esters of lower ($C_1$ to $C_6$) fatty acids e.g. vinyl acetate. The polymeric material can consist of a copolymer of one of the above monomeric materials and a comonomer which does not give a homopolymer having a TG greater than 20° C., provided that the copolymer has the required TG. Examples of such comonomers are ethylacrylate, butadiene, isoprene and chloroprene.

The polymeric material is stabilised by means of a destructible emulsifying agent. The agent has to be destructible, i.e. convertible to an ineffective form, so that it does not interfere with the operation of the second stage of the process. The preferred destructible emulsifying agents are carboxylic acid salts which are not emulsifying agents when in the free acid form. They may be represented by the formula R.COOX where R is a large organic radical attached to the carboxyl salt group COOX. When a relatively strong acid (HA) i.e. an acid that is stronger than the acid from which the emulsifying agent is obtained, is added to the emulsifying agent the following reaction occurs:

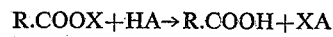

R.COOX+HA→R.COOH+XA

The free acid R.COOH is not an emulsifying agent and thus acidification destroys the carboxylic acid salt type emulsifying agents. In this system the pH of the system can be reduced gradually and this gives a controlled hydrolysis of the emulsifier. This ability for gradual diminution of the emulsifying power of the agent is of value in ensuring that the size of the polymeric material particles is not substantially altered during their passage into the monomeric material according to the process of the present invention. Examples of suitable carboxylic acid salt emulsifying agents are the carboxylic acid soaps and rosin acid salts, e.g. alkali metal or ammonium salts of disproportionated rosin acids, oleic acid, lauric acid, stearic acid, palmitic acid and myristic acid.

Another class of destructible emulsifying agent consists of the alkali of ammonium metal salts of complex organic phosphate esters. Examples of such agents are sold under the trade names Gafac PE 510 and RE 610 and are made by General Aniline Company. These emulsifying agents are destroyed by adding to the aqueous phase a solution of a material which causes precipitation of the agent. For example if a soluble calcium salt is added to the aqueous phase the agent is destroyed and formed into an insoluble calcium salt.

Many other types of emulsifying agent can be regarded as destructible according to the present invention if they can be rendered ineffective as emulsifying agents during the second stage of the process. For example, the alkyl sulphate type emulsifying agents can be rendered ineffective by the addition of heavy metal salts to the system.

The monomeric material consists essentially of vinyl chloride. However, it may contain a minor proportion by weight of other monomers that are copolymerisable with vinyl chloride. When the monomeric material is to be polymerised under suspension polymerisation conditions it is of course necessary to choose copolymerisable compounds so that the monomeric material can be so polymerised. Generally it is found that polymers and copolymers having a glass transition temperature above 20° C. can be formed by suspension polymerisation.

Examples of monomeric materials that can be copolymerised with vinyl chloride are acrylonitrile; vinyl acetate; olefins such as ethylene, propylene, isobutene and 4-methyl pentene-1; acrylate and methacrylate esters, e.g. methyl methacrylate; and fumarate and maleate esters. Preferably the comonomer used in the second stage polymisation does not amount to more than 20% by weight of the monomeric material.

The aqueous latex and the monomeric material are suitably mixed together while the emulsifying agent is destroyed. It is found that, if the two phases are well mixed together and the emulsifying agent destroyed in such a way that the coagulation of the polymeric material particles does not occur, these particles pass into the organic phase without substantial change in size. A protective colloid may be present in the system while the emulsifying agent is destroyed in order to assist the passage of the first polymeric material particles into the monomeric material without substantial alteration of their size. The protective colloids used in this way act at the interface of the monomeric material and the polymeric material and therefore are of the organic type. Examples are polyvinyl alcohols and cellulose ethers.

It will be appreciated that the polymeric particles may absorb the vinyl chloride monomeric material and thus expand in size during the process of the present invention. Such an expansion is not regarded as a substantial alteration in size whereas coagulation in which many particles coalesce to form large macro-sized polymer particles in which the original latex particles have lost their individual identity, is.

The polymerisation of the monomeric material may be brought about by any convenient means. For example, the monomeric material containing the dispersed particles may be separated from the aqueous phase and then polymerised by known mass polymerisation techniques. Most suitably, however, the monomeric material is subjected to known suspension polymerisation procedures in the presence of the aqueous phase of the polymeric material latex. The fact that the emulsifying agent is destroyed means that its concentration in the aqueous phase is low enough not to give rise to emulsion polymerisation and thus there should be no loss of production in the aqueous phase as emulsified material.

The polymerisation may be initiated before or after the destruction of the emulsifying agent but it is preferred that the destruction is completed before polymerisation commences and thus the chance of the formation of unwanted emulsion polymer is reduced.

If the polymerisation is to be effected under suspension polymerisation conditions any of the known suspension stabiliser systems for vinyl chloride polymerisation may be employed. Such suspension stabiliser sysstems can contain suspending agents of the organic or inorganic type and can be water soluble or insoluble. Examples of suitable organic suspending agents are polyvinyl alcohol, partially hydrolysed polyvinylacetates, salts of styrene-maleic anhydride copolymers, gelatin, cellulose others such as methyl cellulose, hydroxypropyl methyl cellulose and hydroxyethyl cellulose. Examples of suitable inorganic suspending agents are sparingly soluble metal phosphates such as hydroxy apatite. Mixtures of organic and inorganic suspending agents and of water soluble and insoluble suspending agents can be used. If the suspending agent employed is conventional, for example a water soluble organic agent such as polyvinyl alcohol, it is suitably present in an amount in the range 0.005–1.0% by weight of the monomeric material employed and an inorganic suspending agent such as hydroxy apatite is suitably present in an amount in the range 0.05–1.0% by weight of the monomeric material employed.

The suspending agent or the suspension sstabiliser system can be added either before or after the destruction of the emulsifying agent.

The efficiency of the suspension stabiliser can be increased by the well known technique of including buffers and/or wetting agents in the system. It is important that the amount of wetting agent should not be so great as to cause emulsification of the monomeric materials. Examples of suitable wetting agents include anionic surface active agents such as sodium caproate and sodium oleate, organic sulphates and sulphonates such as long chain alkyl sulphates and sulphonates, alkyl aromatic sulphonates, arylalkyl polyether sulphonates and sodium salts of alkyl phosphates.

After the emulsifying agent has been destroyed in the sense that it is no longer present in sufficient quantity to give rise to emulsion polymerisation, there may still be a sufficient quantity of the agent present to increase the efficiency of any suspending agent employed in the final polymerisation.

Conventional components of vinyl chloride polymerisation systems can be present in the polymerisation step of the present invention, e.g. polymerisation initiator systems, molecular weight modifiers and the like. These are chosen according to the requirements of the monomeric material being polymerised. Similarly if suspension polymerisation conditions are to be employed conventional phase ratios of organic to aqueous phases can be employed.

The process of the present invention can be widely applied for the incorporation of any polymeric material that has a glasss transition temperature greater than 20° C. and can be formed into a stable latex, into a second polymeric material containing vinyl chloride that can be formed by mass of suspension polymerisation procedures.

The physical properties of polymer compositions often depend on the nature and size of the dispersed polymer particles. By control of the emulsion polymerisation process by which the first polymeric material latex is formed by known means, the size of the latex particles can be adjusted and thus the size of the dispersed polymer particles in the final product can be controlled. For many compositions the best properties are obtained when the dispersed polymeric material has an average particle size below 10 microns, preferably between 0.05 and 5 microns. Such particle sizes are readily obtained by emulsion polymerization procedures. Similarly the nature of the first polymeric material can be easily adjusted by selection of the monomeric materials present in the emulsion polymerization system in which it is formed and by after treatment of the latex.

It will be readily appreciated that the quantity of first polymeric material that can be introduced into the monomeric material is limited by the need to obtain a polymer in monomer suspension system that can be subsequently polymerised. Generally the polymeric material orginially present in aqueous latex form does not constitute more than 50% by weight of final product.

The following examples illustrate the process of the present invention. The parts by weight (p.b.w.) bear the same relationship of the parts by volume (p.b.v.) as do grams to millitres.

EXAMPLE 1

The following ingredients were used:

(1) Vinyl chloride—700 p.b.w.
(2) Distilled water—2,744 p.b.w.
(3) Polyvinyl alcohol (Elvanol 50–42)—7 p.b.w.
(4) Styrene/acrylonitrile latex—solids content 50%—emulsifying agent a rosin acid salt—112 p.b.w.
(5) Aqueous acetic acid (10% w./w.)—4 p.b.v.
(6) Lauroyl peroxide—2 p.b.w.

The polyvinyl alcohol was dissolved in the distilled water and the latex was added to the solution. The acetic acid was added slowly to the stirred mixture over a 10 minute period and then the mixture was poured into a stainless steel reactor. The lauroyl peroxide was added and the reactor closed purged with nitrogen and evacuated. The vinyl chloride was sucked into the reactor and polymerised under suspension conditions for 18 hours at 60° C. The product was readily recovered by filtration.

EXAMPLE 2

The process of Example 1 was repeated using the following ingredients and a suspension polymerisation time of 21 hours.

(1) Vinyl chloride—700 p.b.w.
(2) Distilled water—2,332 p.b.w.
(3) Acrylonitrile/polybutadiene/styrene copolymer (ABS) latex—solids content, 25% by weight—emulsifying agent, a rosin acid salt—224 p.b.w.
(4) Polyvinyl alcohol (Elvanol 50–42)—7 p.b.w.
(5) Aqueous acetic acid (10% w./w.)—5 p.b.v.
(6) Lauroyl peroxide—2 p.b.w.

Microscopic examination of the dry product indicated that the particle sizes ranged from $10\mu$ to $150\mu$.

EXAMPLE 3

The procedure of Example 1 was repeated, but with a suspension polymerisation time of 16 hours, using the following ingredients:

(1) Vinyl chloride—700 p.b.w.
(2) Distilled water—2,744 p.b.w.
(3) Styrene/acrylonitrile copolymer latex—solids content, 50%—emulsifying agent a rosin acid salt—56 p.b.w.
(4) Polyvinyl alcohol (Elvanol 50–42)—7 p.b.w.
(5) Aqueous acetic acid (10% w./w.)—2 p.b.v.
(6) Lauroyl peroxide—2 p.b.w.

Microscopic examination of the dry product indicated that the particle sizes ranged from $10\mu$ to $500\mu$.

EXAMPLE 4

The following ingredients were employed:

(1) A polymethyl methacrylate latex—solids content, 31.5%—emulsifying agent, sodium laurate—111 p.b.w.
(2) Vinyl chloride—700 p.b.w.
(3) Polyvinyl alcohol (Alcotex 88–10)—14 p.b.w.
(4) Distilled water—2,000 p.b.w.
(5) Aqueous acetic acid (10% w./w.)—10 p.b.v.
(6) Lauroyl peroxide—2 p.b.w.

The polyvinyl alcohol was dissolved in the distilled water and the latex was added to the solution. The acetic acid was added to the stirred mixture over a 10 minute period. The mixture was poured into a stainless steel reactor and the lauroyl peroxide was added. After purging and evacuating the reactor, the vinyl chloride was sucked in and the mitxure was stirred at 700 r.p.m. The charge was heated at 60° C. for 8 hours, the reactor was cooled and the residual monomer vented off.

The product was easily separated from the aqueous phase by basket centrifuge and it was washed with water in the centrifuge and dried. Chlorine analysis indicated that the chlorine content of the powder was 53.9% w./w.; thus the vinyl chloride content was 95%.

I claim:

1. A process for the preparation of a polymer composition which comprises mixing an addition polymeric material which has a glass transition temperature above 20° C. and which is not soluble in vinyl chloride, said polymeric material being a polymer or copolymer from a monomeric material selected from the group consisting of ethylene, propylene, styrene, acrylonitrile, lower ($C_1$ to $C_6$) alkyl methacrylates, and vinyl ester of lower ($C_1$ to $C_6$) fatty acids, in the form of an aqueous latex stabilized by means of a destructible emulsifying agent with monomeric material comprising vinyl chloride, and, either prior to or after said mixing, destroying the emulsifying agent without substantially altering the size of the polymeric particles, allowing particles to pass into the monomeric material comprising vinyl chloride, and polymerizing the monomeric material with said particles dispersed therein.

2. A process as claimed in claim 1, wherein the emulsifying agent is a carboxylic acid salt.

3. A process as claimed in claim 2, wherein the emulsifying agent is destroyed by the addition of a relatively strong acid to the system.

4. A process as claimed in claim 1 wherein the monomeric material consists of vinyl chloride.

5. A process as claimed in claim 1, wherein the monomeric material is polymerised under suspension polymerisation conditions in the presence of the aqueous phase of the polymeric material latex.

References Cited

UNITED STATES PATENTS

| 3,370,105 | 2/1968 | De Bell et al. | 260—878 R |
| 3,358,054 | 12/1967 | Hardt et al. | 260—878 R |
| 3,487,129 | 12/1969 | Platzer | 260—878 R |

FOREIGN PATENTS

| 876,967 | 9/1961 | Great Britain | 260—884 |
| 1,054,062 | 1/1967 | Great Britain | 260—878 |

JOSEPH L. SCHOFER, Primary Examiner

A. HOLLER, Assistant Examiner

U.S. Cl. X.R.

260—884, 885